3,290,334
THE PREPARATION OF SYM-DIFURYL AND SYM-DIVINYLGLYCOLS FROM FURFURAL AND α,β-ETHYLENICALLY UNSATURATED ALDEHYDES
George Smith, Richmond, Calif., assignor to Shell Oil Company, New York, N.Y., a corporation of Delaware
No Drawing. Filed Oct. 9, 1963, Ser. No. 314,871
6 Claims. (Cl. 260—347.8)

This invention relates to an improved method for the production of glycols. More particularly, it relates to an improved method for the production of sym-divinylglycols.

Methods are available in the art for the reductive coupling of α,β-ethylenically unsaturated aldehydes to produce sym-divinylglycols, that is, those compounds possessing one hydroxyl substituent on each of two adjacent carbon atoms, each carbon atom being further substituted with an α,β-ethylenically unsubstituted organic substituent. Typical of these methods is that disclosed by Young et al., J. Am. Chem. Soc., 58, 2274 (1936), who employed a zinc/copper couple to effect the conversion of crotonaldehyde to α,α'-dipropenylglycol. Although moderate yields of this glycol were obtained, the success of the reductive coupling process appeared to depend to a considerable extent upon the care with which the zinc/copper couple was prepared. To obtain satisfactory results, it was found to be necessary to prepare the couple by a slow addition of aqueous copper sulfate to zinc mesh with considerable intervals of time between additions of small volumes of the aqueous solution. When the zinc/copper couple was prepared more rapidly, the yield of glycol obtained by the use thereof decreased by as much as 15%. While the use of such a metal couple appears to be satisfactory for the production of small amounts of certain glycols, the process is not readily adaptable for a larger scale commercial operation.

It is an object of this invention to provide an improved method for the production of sym-divinylglycols. More particularly, it is an object to provide a process for the reductive coupling of α,β-ethylenically unsaturated carbonylic compounds to produce sym-divinylglycols.

It has now been found that these objects are accomplished by the process of contacting an acidic solution of an α,β-ethylenically unsaturated carbonylic compound with certain metal amalgams. The use of metal amalgam reductant appears to extend the scope of the reductive coupling process as well as to greatly increase the facility with which the coupling process is conducted.

The α,β-ethylenically unsaturated carbonylic compounds employed as reactants in the process of the invention have from 3 to 19 carbon atoms and possess a carbonyl group, i.e.,

group, which is conjugated with ethylenic unsaturation, i.e., a non-aromatic carbon-carbon double bond. Preferred, α,β-ethylenically unsaturated carbonylic compounds are represented by the formula

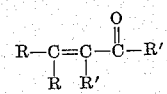

wherein R and R' independently are hydrogen, alkyl, preferably alkyl having 1 to 10 carbon atoms, more preferably 1 to 4, and aryl, preferably aryl having 6 to 10 carbon atoms, more preferably phenyl, with the proviso that one R and one R' may together form a divalent non-acetylenic aliphatic radical having, besides hydrogen atoms, only from 1 to 4 carbon atoms and from 0 to 1 oxygen atoms which oxygen atoms are a portion of the ring formed by the divalent radical and the carbon-containing moiety to which it is attached, i.e., any oxygen is ring oxygen atom. Illustrative alkyl, including aralkyl, R and R' groups are methyl, ethyl, propyl, butyl, sec-butyl, tert-amyl, hexyl and benzyl, while exemplary aryl, including alkaryl R and R' groups include phenyl, tolyl, xylyl, p-ethylphenyl and cumyl.

The α,β-ethylenically unsaturated carbonylic compounds employed as reactants in the process of the invention therefore include hydrocarbon aldehydes such as acrolein, crotonaldehyde, methacrolein, α-methylcrotonaldehyde, 2,3-dimethyl-2-hexenal, 3-ethyl-2-decenal, α-phenylacrolein, 1-formylcyclohexene, cinnamaldehyde and β-(p-tolyl)-acrolein; hydrocarbon ketones such as methyl vinyl ketone, phenyl vinyl ketone, methyl propenyl ketone, benzyl 1-butenyl ketone, cyclohex-2-enone and β-phenylvinyl ethyl ketone; heterocyclic aldehydes such as furfural, 5,6-dihydro-2H-pyran-2-carboxaldehyde and 3,4-dihydro-2H-pyran-4-carboxaldehyde; and heterocyclic ketones such as 3 - propionyl - 5,6 - dihydro-2H-pyran and α-acetylfuran. Preferred α,β-ethylenically unsaturated carbonylic compounds are those compounds of the above-depicted formula wherein R and R' independently are hydrogen or alkyl having from 1 to 4 carbon atoms, and particularly preferred are those compounds wherein R and R' independently are hydrogen or methyl.

The metal amalgam employed as a reductant in the process of the invention is an alloy of mercury and an active metal, that is, a metal sufficiently active to replace hydrogen ions in solution. The choice of the metal to be employed in the amalgam is a critical feature of the process of the invention, for if the metal is not sufficiently active, the process of the invention is not operable, but alternatively if the metal is too active, selective reductive coupling is not observed and considerable undesirable reduction of the unsaturated carbonylic compound to the corresponding alcohol and/or reduction, i.e., saturation, of the ethylenically unsaturated linkage takes place. The suitability of a metal for utilization in the amalgams may be determined from consideration of the standard oxidation potential of the metal when measured against the standard hydrogen electrode. Metals that are suitable have standard oxidation potentials from about 0.5 volt to about 1.2 volts. Illustrative of such metals are zinc, gallium and manganese. Preferred metals, however, have a standard oxidation potential from about 0.6 volt to about 1.0 volt, and most preferred as the metal to be employed in the amalgam utilized in the process of the invention is zinc.

The amalgams employed comprise mercury with a small percentage of the active metal. Amalgams containing from about 1% to about 10% by weight of active metal are satisfactory, although it is preferred to employ amalgam containing from about 2% to about 5% active metal. The amalgam is employed in sufficient quantity to furnish at least one equivalent of active metal for each mole of unsaturated carbonylic compound. Although an excess of active metal may be employed to increase the rate of reaction, ratios of equivalents of active metal to moles of carbonylic compound from about 1:1 to about 4:1 are satisfactory, the magnitude of such a rate increase is small, and in general it is preferred to employ a ratio of active metal to carbonylic compound that is substantially stoichiometric, i.e., a ratio of equivalents of active metal to moles of carbonylic compound that is about 1:1.

The amalgam is contacted with an acidic solution of the α,β-ethylenically unsaturated carbonylic compound. The presence of acid is required, as it is considered that the reductive coupling process of the invention involves reaction of the carbonylic compound with electrons from the active metal and protons from the acid. The acid that is utilized must therefore be sufficiently strong to serve as an efficient source of protons, and be sufficiently soluble in the solvent employed to afford a suitable concentration of acid. The acids that are suitable have a $pK_a$, defined as the negative logarithm of the ionization constant of a 0.1 normal aqueous solution of the acid at 25° C., which is below about 5. The acid employed is sufficiently soluble in the solvent so that the concentration of acid at the outset of reaction is above about 3.5 normal and preferably above about 4.5 normal. The initial concentration of the acid is, however, preferably no greater than about 6.5 normal. Illustrative of such acids are organic acids, especially monocarboxylic lower alkanoic acids such as formic acid, acetic acid, propionic acid, butyric acid and valeric acid, and polycarboxylic acids such as oxalic acid and citric acid; as well as inorganic acids such as sulfuric acid and phosphoric acid, which acid is considered to function as a dibasic acid in the process of the invention. It is desirable, however, to avoid the utilization of an acid possessing a labile halogen atom, for example, a hydrogen halide such as hydrochloric acid or hydrobromic acid, as the presence of halide ions appears to be detrimental to the process of the invention. Best results are obtained when acetic acid is employed and the use of this acid is preferred, particularly when the initial concentration of acetic acid is from about 4.5 normal to about 5.5 normal.

The acid is employed in amounts equivalent to or in excess over the amount of $\alpha,\beta$-ethylenically substituted carbonylic compound. Satisfactory results are obtained when ratios of equivalents of acid to moles of carbonylic compound from about 1:1 to about 5:1 are employed, although it is preferred to employ a ratio of acid to carbonylic compound that is substantially stoichiometric, i.e., a ratio of equivalents of acid to moles of carbonylic compound of about 1:1.

The solvents that are sutiably employed in the acidic solution of $\alpha$-$\beta$,ethylenically unsaturated carbonylic compound are liquid at reaction temperature, are inert toward the acidic and reductive reaction conditions utilized in the process of the invention and additionally are unreactive toward the unsaturated carbonylic reactant and the glycol obtained therefrom. Thus, solvents such as esters and ketones are not satisfactory. Illustrative of suitable inert solvents are water; the alcohols, particularly lower alkanols such as methanol, ethanol, isopropanol, tert-butanol, ethylene glycol and glycerol, as well as the ether-alcohols, e.g., the cellosolves and the carbitols; hydrocarbons including aliphatic hydrocarbons, e.g., hexane, isooctane, pentane and cyclohexane, as well as aromatic hydrocarbons such as benzene, toluene, xylene and ethylbenzene; ethers including acyclic ethers, e.g., diethyl ether, dibutyl ether, methyl hexyl ether and lower alkyl ethers (full) of polyhydric alcohols such as ethylene glycol dimethyl ether, diethylene glycol dimethyl ether, glycerol triethyl ether and 1,2,6-hexanetriol tributyl ether, as well as cyclic ethers such as dioxane, tetrahydrofuran and tetrahydropyran; and miscible mixtures thereof. Preferred as solvent, largely for economic reasons, is water, or aqueous mixtures.

The process of the invention is suitably conducted in a batchwise or in a continuous manner. A typical batchwise procedure comprises charging the metal amalgam to a suitable reactor and adding a solution of the $\alpha,\beta$-ethylenically unsaturated carbonylic compound in the desired solvent. The acid is then added, in a concentric form, so that upon mixing with the solvent already present, the acid will be diluted to the desired concentration. It has been found to be desirable to agitate the amalgam during the course of reaction so that a continually fresh amalgam surface will be presented to the solution. It is not necessary, however, to agitate the amalgam to the extent that the amalgam forms a dispersion in the solvent phase, and in general, such vigorous agitation is to be avoided. The reaction is suitably conducted at comparably low temperatures. Suitable reaction temperatures vary from about −10° C. to about 25° C., although reaction temperatures from about 5° C. to about 15° C. are preferred. When the active metal, the acid and the carbonylic compound are employed in substantially stoichiometric quantities, or when only the acid or only the metal are present in excess, the reaction, if desired, may be allowed to go to completion, although it is often preferable to operate at somewhat less than maximum conversion to minimize the possibility of secondary reduction processes leading to undesirable products. When both the acid and metal are present in excess, the reaction should be halted no later than the time when amounts of acid and metal which are equivalent to the amount of carbonylic compound have been consumed. Subsequent to reaction, the solvent phase is separated from the amalgam by such conventional methods as decantation, and the organic products are separated and recovered by methods such as fractional distillation, selective extraction or the like.

Alternatively, however, the process of the invention may be conducted in a continuous manner, as by countercurrently contacting the amalgam with the solution of the carbonylic compound and acid for sufficient time to achieve the desired degree of reaction. The solvent phase is then separated for product recovery, and the spent amalgam may be passed to a chamber wherein the active metal concentration may be regenerated, as by electrolysis techniques.

The products of the process of the invention are sym-divinylglycols, that is, compounds containing a hydroxyl group on each of two adjacent carbon atoms, each carbon atom also possessing an $\alpha,\beta$-ethylenically unsaturated substituent. When prepared from the preferred $\alpha,\beta$-ethylenically unsaturated carbonylic compounds, the divinylglycol products are represented by the formula

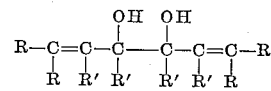

wherein R and R' have the previously stated significance. Typical of such products are $\alpha,\alpha'$-divinylglycol prepared from acrolein, $\alpha,\alpha'$-dipropenylglycol prepared from crotonaldehyde, $\alpha,\alpha'$-dimethyl-$\alpha,\alpha'$-divinylglycol prepared from methyl vinyl ketone, tetradeca-5,9-dien-7,8-diol prepared from 2-heptenal, 2,5-dimethylhexa-1,5-dien-3,4-diol prepared from methacrolein and $\alpha,\alpha'$-di($\alpha$-furyl)glycol prepared from furfural.

The products of the invention are useful as chemical intermediates. For example, the glycols are converted by known methods to the divinylethylene oxides which may in turn be epoxidized to the triepoxide which is useful as an epoxy resin precursor. From the divinylglycols and additional $\alpha,\beta$-ethylenically unsaturated carbonylic compound are prepared cyclic acetals or ketals, which are dioxolanes possessing three $\alpha,\beta$-ethylenically unsaturated substituents. Such trivinyldioxolanes are epoxidized to the cyclic trisepoxide, also useful as a closely-knit polyfunctional epoxy resin precursor, or alternatively the elements of hydrogen sulfide or ammonia may be added to the $\alpha,\beta$-unsaturated linkages to produce trisamines or trismercaptans which are useful as epoxy curing agents.

To further illustrate the process of the invention, the following examples are provided. It should be understood that they are not to be regarded as limitations, as the teachings thereof may be varied as will be understood by one skilled in this art.

*Example I*

To a 1 liter flask equipped with a stirrer and a dropping funnel, which flask was cooled in an ice-water bath, was charged 1090 g. of 3% w. zinc amalgam (0.5 g.-atom Zn), 200 ml. of water and 56 g. (1 mole) of acrolein. Stirring of the amalgam at a rate sufficient to constantly turn the amalgam surface was begun, and 60 g. (1 mole) of glacial acetic acid was added over a 0.75 hour period.

The stirring was continued overnight, a total of 17 hours. To the product mixture was added 50 ml. of ether and the mixture was neutralized with potassium carbonate. The mercury was then separated and the aqueous phase extracted with six 75 ml. portions of ether. The extract was dried over magnesium sulfate and fractionally distilled to give 38.6 g. of α,α'-divinylglycol, B.P. 105–106° C. at 20 mm., which represented a 74.5% yield based upon a 69% conversion.

Example II

The procedure of Example I was repeated, except that reaction was stopped after a 6 hour period. The amount of α,α'-divinylglycol obtained was 17.72 g., which represented a yield of 81.3% based upon a 31% conversion.

Example III

To a 1 liter flask which was cooled in an ice-water bath and which was equipped with a stirrer and dropping funnel was charged 1090 g. of 3% w. zinc amalgam (0.5 g.-atom Zn), 200 ml. of water and 70 g. (1 mole) of crotonaldehyde. Stirring of the amalgam surface was begun and 56 g. of glacial acetic acid was added over a 0.5 hour period. The reaction was allowed to continue for 17 hours, at which time 50 ml. of ether was added and the product mixture was neutralized with potassium carbonate. The mixture was extracted with six 75 ml. portions of ether, and the extract was dried over magnesium sulfate and fractionated to afford 47.6 g. of α,α'-dipropenylglycol, B.P. 134–5° C. at 20 mm., which represented a 78% yield based upon a 68% conversion.

Example IV

The procedure of Example III was repeated, except that 70 g. (1 mole) of methyl vinyl ketone was employed as the unsaturated carbonylic reactant. A total of 39.7 g. of α,α'-dimethyl-α,α'-divinylglycol was obtained, B.P. 91–2° C. at 20 mm., which represented a yield of 72% based upon a conversion of 56.8%.

Example V

The procedure of Example III was followed except that 96 g. (1 mole) furfural was employed in place of the crotonaldehyde. Subsequent to reaction, the product mixture was neutralized and extracted with ether. The extract was dried and the solvent was removed at reduced pressure. The residue obtained thereby was fractionally distilled to afford 15.7 g. of α,α'-di(α-furyl)glycol, B.P. 130–135° C. at 1 mm., which represented a yield of 33.9% based upon a 16.35% conversion. This product is believed to be a novel compound.

Example VI

By a procedure similar to that of Example I, acrolein was reacted with zinc amalgam in acetic acid solution in several different solvents. The results of these experiments are summarized below.

| Solvent | Conversion | Yield | Moles Acrolein | Moles Acetic Acid | G-Atom Zn | Reaction Time, hrs. |
|---|---|---|---|---|---|---|
| Methanol | 56.2 | 63 | 1 | 2 | 2 | 16 |
| t-Butanol | 75 | 76 | 2 | 3 | 3 | 16 |
| Tetrahydrofuran | 65 | 68 | 2 | 3 | 3 | 16 |
| Benzene | 61.5 | 65 | 2 | 3 | 3 | 16 |
| Do | 21 | 91.5 | 1 | 2 | 1 | 6 |

Example VII

Several experiments were conducted by a procedure similar to that of Example I, varying the acid employed in the conversion of acrolein to α,α'-divinylglycol with zinc amalgam in aqueous solution. The results are shown below.

| Acid, percent w. | Conversion | Yield | Mole Acrolein | Moles Acid | G-atom Zn | Reaction Time, hrs. |
|---|---|---|---|---|---|---|
| H₃PO₄, 25.2 | 57.5 | 60 | 3 | 2 | 3 | 17 |
| H₂SO₄, 20 | 60 | 70 | 1 | 1 | 2 | 19 |
| HC₂H₃O₂, 37.5 | 70 | 73 | 1 | 2 | 1 | 17 |

Example VIII

To illustrate the effect of varying the active metal from which the amalgam is prepared, various 3% metal amalgams were employed to convert acrolein to α,α'-divinylglycol in aqueous acetic acid solution. The results are shown below.

| Metal | Oxidation Potential, v. | Conversion | Yield |
|---|---|---|---|
| Pb | 0.126 | 0 | 0 |
| Sn | 0.136 | 0 | 0 |
| Cd | 0.403 | 5.7 | 10 |
| Zn | 0.763 | 70 | 72 |
| Al | 1.66 | 13 | 15 |
| Mg | 2.37 | 10 | 13.2 |
| Na | 2.71 | 8 | 10 |

I claim as my invention:

1. The process for the production of sym-divinylglycols by bringing into intimate contact (1) a solution of the α,β-ethylenically unsaturated carbonylic compound of from 3 to 19 carbon atoms of the formula

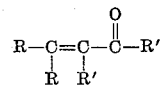

wherein R and R' are independently selected from the group consisting of hydrogen, alkyl and aryl, in aqueous acid solution, said acid having a pK_a below about 5 and having no labile halogen atoms, and said solution having an initial acid concentration from about 3.5 normal to about 6.5 normal; with (2) zinc amalgam containing from about 1% to about 10% zinc by weight.

2. The process for the production of α,α'-di(α-furyl) glycol by bringing into intimate contact (1) a solution of furfural in aqueous acetic acid, the acetic acid being present in an initial concentration of from about 4.5 normal to about 6.5 normal, with (2) zinc amalgam containing from about 2% to about 5% zinc by weight, at a temperature from about −10° C. to about 25° C.

3. The process for the production of sym-divinylglycols by bringing into intimate contact (1) a solution of the α,β-ethylenically unsaturated compound of the formula

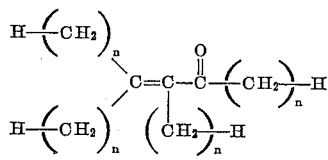

wherein $n$ is a whole number from 0 to 1 inclusive, in aqueous acetic acid, the acetic acid being present in an initial concentration of from about 4.5 normal to about 6.5 normal; with (2) zinc amalgam containing from about 2% to about 5% zinc by weight, at a temperature from about −10° C. to about 25° C.

4. The process of claim 3 wherein the α,β-ethylenically unsaturated compound is acrolein.

5. The process of claim 3 wherein the ethylenically unsaturated compound is crotonaldehyde.

6. The process of claim 3 wherein the ethylenically unsaturated compound is methyl vinyl ketone.

No references cited.

ALEX MAZEL, *Primary Examiner.*

HENRY R. JILES, *Examiner.*

J. H. TURNIPSEED, *Assistant Examiner.*